United States Patent Office 3,721,701
Patented Mar. 20, 1973

3,721,701
RADIOPAQUE TRIIODOALKYLUREIDO BENZOIC ACIDS
Jack Bernstein and Kathryn Alice Losee, New Brunswick, N.J., assignors to E. R. Squibb & Sons, Inc., New York, N.Y.
No Drawing. Filed June 19, 1970, Ser. No. 47,902
Int. Cl. C07c 127/16, 127/18
U.S. Cl. 260—471 R      6 Claims

ABSTRACT OF THE DISCLOSURE

Compounds having the formula

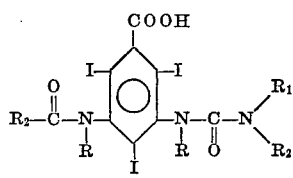

wherein R and $R_1$ are hydrogen or lower alkyl and $R_2$ is lower alkyl, as well as salts and lower alkyl esters of these compounds are useful as diagnostic agents.

---

It is an object of the present invention to provide new compounds which are useful radiopaque agents. Another object is to provide methods for the preparation of these compounds. These and other objects of the present invention will be apparent from the following description.

Although the sodium salt of 3-acetamide-2,4,6-triiodo-5-ureidobenzoic acid has been prepared (U.S. Pat. 3,004,964), its use as a diagnostic agent is limited due to its low water solubility (25 grams/100 ml.). We have unexpectedly found that the sodium salt of 3-acetamido-2,4,6-triiodo-5-alkylureidobenzoic acids are appreciably more water-soluble. Thus the sodium salt of 3-acetamido-2,4,6-triiodo - 5 - (3-methylureido)-benzoic acid readily forms a solution containing more than 60 grams/100 ml. and can therefore give highly concentrated solutions suitable for use as X-ray contrast medium.

The new compounds of the present invention include 3-acylamido-2,4,6-triiodo-5-(3-alkylureido)benzoic acids, such as 3-acetamido - 2,4 - triiodo-5-(3-methylureido) benzoic acid, 3 - acetamido - 2,4,6 - triiodo - 5 - (3-ethylureido)benzoic acid, 3-(acetyl methylamino)-2,4,6-triiodo-5-(3-methylureido)benzoic acid and 3-(acetylmethylamino)-2,4,6-triiodo-5-(3-ethylureido)benzoic acid; 3-acylamido-2,4,6-triiodo - 5 - (3,3-dialkylureido)benzoic acids, such as 3-acetamido-2,4,6-triiodo-5-(3,3-dimethylureido)benzoic acid and 3-acetamido-2,4,6-triiodo-5-(3,3-diethylureido)benzoic acid; 3-acylamido-2,4,6-triiodo-5-(1,3-dialkylureido)benzoic acids such as 3-acetamido-2,4,6-triiodo-5-(1,3-diethylureido)benzoic acid; and 3-acylamido-2,4,6-triiodo-5-(1,3,3 - trialkylureido)benzoic acids such as 3-acetamido-2,4,6-triiodo-5-(1-ethyl-3,3-dimethylureido)benzoic acid.

The compounds of this invention may be prepared by reaction of a compound of the formula (II)

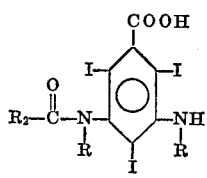

with an alkyl isocyanate of the formula (III)      $R_2$—NCO or a dialkylcarbamoyl halide of the formula (IV)

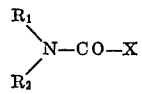

wherein X is halogen, preferably chlorine and R, $R_1$ and $R_2$ are as previously defined. The reactions are carried out in an inert solvent such as ethylene glycol dimethyl ether, diethylene glycol dimethyl ether, dimethylformamide, dimethylacetamide, tetrahydrofuran, dimethylsulfoxide and the like.

The compounds of Formula II may be prepared by iodination of a compound of the formula (V)

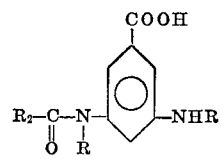

prepared by the general methods outlined in Farmaco Ed. Sic. 17 340 (1962) by Pitre and Fumagalli.

The lower alkyl groups R, $R_1$ and $R_2$ include straight or branched alkyl chains of up to 6 carbon atoms such as methyl, ethyl, propyl, i-propyl, n-butyl, i-butyl, n-pentyl, 2-methylbutyl, neopentyl, n-hexyl, 2-methylpentyl, 3-methylpentyl, 2,2-dimethylbutyl, and 2,3-dimethylbutyl. The basic physiologically acceptable salts include alkali metal salts such as, for example, sodium and potassium; alkaline earth salts, such as, for example, calcium; and ammonium salts such as, for example, N-methylglucamine.

The new products of Formula I are useful as radiopaque agents for visualization of animal systems or organs, preferably in the form of physiologically acceptable salts such as sodium or methylglucamine salts for the preparation of solutions for intravascular injection for urography and for vasographic techniques such as angiocardiography, arteriography, nephrography and venography. The water-insoluble esters are useful in visualizing hollow organs and cavities having external orifices through which the contrast preparation can be introduced in preparation for the examination and removal after the examination is completed. Solutions having about 20 to 50% bound iodine, preferably about 37%, may be used, or on a weight basis from about 30 g. to about 80 g. of a compound of Formula I per 100 ml. of water.

The following examples illustrate the present invention without, however, limiting the same thereto. All temperatures are on the centigrade scale.

EXAMPLE 1

3-acetamido-2,4,6-triiodo-5-(3-methylureido) benzoic acid

A mixture of 2 grams of 3-acetamido-5-amino-2,4,6-triiodobenzoic acid, 2 ml. of methyl isocyanate and 100 ml. of ethylene glycol dimethyl ether is heated under reflux for twenty-four hours. The solvent is removed by distillation under reduced pressure and triturated with dilute hydrochloric acid. The solid is filtered and dissolved in dilute aqueous sodium hydroxide solution. The solution is treated with decolorizing carbon, filtered and made strongly acid with 20% hydrochloric acid. The precipitated solid is filtered, washed thoroughly with water and dried under reduced pressure at 100°. The 3-acetamido-2,4,6-triiodo-5-(3-methylureido)benzoic acid thus obtained melts at 210–213° with decomposition.

EXAMPLE 2

3-acetamido-2,4,6-triiodo-5-(3-ethylureido)benzoic acid

Following the procedure of Example 1 but substituting an equivalent amount of ethyl isocyanate for the methyl isocyanate there is obtained the desired 3-acetamido-2,4,6-triiodo-5-(3-ethylureido)benzoic acid.

EXAMPLE 3

3-valeramido-2,4,6-triiodo-5-(3-methylureido) benzoic acid

Following the procedure of Example 1 but substituting an equivalent amount of 3-valeramido-2,4,6-triiodo-5-amino-benzoic acid for the 3-acetamido-2,4,6-triiodo-5-aminobenzoic acid, there is obtained the desired 3-valeramido-2,4,6-triiodo-5-(3-methylureido)benzoic acid.

EXAMPLE 4

3-(acetylmethylamino)-2,4,6-triiodo-5-(3-methylureido) benzoic acid

Following the procedure of Example 1 but substituting an equivalent amount of 3-(acetylmethylamino)-5-amino-2,4,6-triiodobenzoic acid for the 3-acetylamino-5-amino-2,4,6-triiodobenzoic acid, there is obtained the desired 3-(acetylmethylamino) - 2,4,6 - triiodo-5-(3-methylureido) benzoic acid.

EXAMPLE 5

3-(acetylmethylamino)-2,4,6-triiodo-5-(3-ethylureido) benzoic acid

Following the procedure of Example 1 but substituting an equivalent amount of 3-(acetylmethylamino)-5-amino-2,4,6-triiodobenzoic acid for the 3-acetylamino-5-amino-2,4,6-triiodobenzoic acid, and an equivalent amount of ethyl isocyanate for the methyl isocyanate, there is obtained the desired 3-(acetylmethylamino)-2,4,6-triiodo-5-(3-ethylureido)benzoic acid.

EXAMPLE 6

3-acetamido-2,4,6-triiodo-5-(3,3-dimethylureido) benzoic acid

To a stirred mixture of 2 grams of 3-acetamido-5-amino-2,4,6-triiodobenzoic acid in 20 ml. of anhydrous pyridine there is added dropwise, with cooling, a solution of 1 gram of dimethylcarbamoyl chloride in 10 ml. of anhydrous benzene. The reaction mixture is stirred for two hours and is then concentrated under reduced pressure to remove the benzene. The residue is poured into ice and dilute hydrochloric acid. The precipitated solid is filtered, dissolved in dilute aqueous sodium hydroxide and treated with decolorizing carbon. The solution is filtered and made strongly acid with 20% hydrochloric acid. The solid is filtered, washed with water and dried at 100° under reduced pressure to yield the desired 3-acetamido-2,4,6-triiodo - 5 - (3,3-dimethylureido)benzoic acid.

EXAMPLE 7

3-(acetylmethylamino)-2,4,6-triiodo-5-(3,3-dimethylureido)benzoic acid

Following the procedure of Example 6 but substituting an equivalent amount of 3-(acetylmethylamino)-5-amino-2,4,6-triiodobenzoic acid for the 3-acetylamino-5-amino-2,4,6-triiodobenzoic acid, there is obtained the desired 3-(acetylmethylamino) - 2,4,6 - triiodo-5-(3,3 - dimethylureido)benzoic acid.

EXAMPLE 8

3-acetamido-2,4,6-triiodo-5-(3,3-di-n-butylureido) benzoic acid

Following the procedure of Example 6 but substituting an equivalent amount of di-n-butylcarbamoyl chloride for the dimethylcarbamoyl chloride, there is obtained the desired 3-acetamido-2,4,6-triiodo-5-(3,3-di-n-butylureido) benzoic acid.

EXAMPLE 9

3-acetamido-2,4,6-triiodo-5-(3,3-diethylureido) benzoic acid

Following the procedure of Example 6 but substituting an equivalent amount of diethylcarbamoyl chloride for the dimethylcarbamoyl chloride, there is obtained the desired 3-acetamido-2,4,6-triiodo-5-(3,3 - diethylureido) benzoic acid.

EXAMPLE 10

3-acetamido-2,4,6-triiodo-5-(3-methyl-1-ethylureido) benzoic acid (a) 3-acetamido-5-ethylamino - 2,4,6 - triiodobenzoic acid.—A suspension of 10.4 grams of 3-acetamido-5-ethylaminobenzoic acid in 500 ml. of water is stirred vigorously and 5.5 ml. of concentrated hydrochloric acid added slowly. To the partial solution thus obtained there is added, over the course of one hour, 67 ml. of a 2.5 M sodium iododichloride solution. The reaction mixture is stirred for 72 hours at room temperature and is then treated with sodium bisulfite solution to remove the excess iodinating agent. The precipitated solid is filtered, washed with water and dried at 60° under reduced pressure to yield the desired 3-acetamido-5-ethylamino-2,4,6-triiodobenzoic acid.

(b) 3-acetamido-2,4,6-triiodo-5-(3 - methyl-1-ethylureido)-benzoic acid.—Following the procedure of Example 1 but substituting an equivalent amount of 3-acetamido-5-ethylamino-2,4,6-triiodobenzoic acid for the 3-acetamido-5-amino-2,4,6-triiodobenzoic acid, there is obtained the desired 3-acetamido-2,4,6-triiodo-5-(3 - methyl-1-ethylureido)benzoic acid.

EXAMPLE 11

3-acetamido-2,4,6-triiodo-5-(1,3-diethylureido)benzoic acid

Following the procedure of Example 10 but substituting an equivalent amount of ethyl isocyanate for the methyl isocyanate, there is obtained the desired 3-acetamido-2,4,6-triiodo-5-(1,3-diethylureido)benzoic acid.

EXAMPLE 12

3-acetamido-2,4,6-triiodo-5-(1-ethyl-3,3-dimethylureido)benzoic acid

Following the procedure of Example 6 but substituting an equivalent amount of 3-acetamido-5-ethylamino-2,4,6-triiodobenzoic acid for the 3 - acetamido-5-amino-2,4,6-triiodobenzoic acid, there is obtained the desired 3-acetamido-2,4,6-triiodo-5-(1-ethyl - 3,3 - dimethylureido)-benzoic acid.

EXAMPLE 13

3-(acetylmethylamino)-2,4,6-triiodo-5-(1-ethyl-3-methylureido)benzoic acid (a) 3 - (acetylmethylamino) - 5 - ethylaminobenzoic acid.—To a mixture of 10 grams of 3-(acetylmethylamino)-5-aminobenzoic acid, 4 ml. of acetaldehyde and 150 ml. of ethanol, which has been allowed to stand for 12 hours, there is added 5 grams of Raney nickel catalyst and the mixture hydrogenated at room temperature and atmospheric pressure. The catalyst is filtered off and the solution concentrated under reduced pressure to yield the desired 3-(acetylmethylamino)-5-ethylaminobenzoic acid.

(b) 3-acetylmethylamino - 5 - ethylamino-2,4,6-triiodobenzoic acid.—Following the procedure of Example 10a but substituting an equivalent amount of 3-(acetylmethylamino)-5-ethylaminobenzoic acid for the 3-acetamido-5-ethylaminobenzoic acid, there is obtained the desired 3-(acetylmethylamino)-5-ethylamino - 2,4,6 - triiodobenzoic acid.

(c) 3-(acetylmethylamino) - 2,4,6 - triiodo-5-(1-ethyl-3-methylureido)benzoic acid.—Following the procedure of Example 1, but substituting an equivalent amount of 3-acetylmethylamino-5-ethylamino - 2,4,6 - triiodobenzoic acid for the 3-acetylamino-5-amino-2,4,6-triiodobenzoic acid, there is obtained the desired 3-(acetylmethylamino)-2,4,6-triiodo-5-(1-ethyl-3-methylureido)benzoic acid.

EXAMPLE 14

3-(acetylmethylamino)-2,4,6-triiodo-5-(1-ethyl-3,3-dimethylureido)benzoic acid

Following the procedure of Example 6 but substituting an equivalent amount of 3-(acetylmethylamino)-5-ethylamino - 2,4,6 - triiodobenzoic acid for the 3-acetamido-5-amino-2,4,6-triiodobenzoic acid, there is obtained the desired 3 - (acetylmethylamino)-2,4,6-triiodo-5-(1-ethyl-3,3-dimethylureido)benzoic acid.

EXAMPLE 15

Ethyl 3-acetamido-2,4,6-triiodo-5-(3-methylureido)-benzoate

To a slurry of 20 grams of 3-acetamido-2,4,6-triiodo-5-(methylureido)benzoic acid in 100 ml. of anhydrous ethanol there is added a solution of 2 grams of potassium hydroxide in 5 ml. of anhydrous ethanol. To this mixture there is added 4.5 ml. of diethyl sulfate and the reaction mixture stirred for twenty-four hours. The mixture is then diluted with 250 ml. of water and the precipitated solid collected by filtration. The solid is suspended in dilute alkali and filtered. The ethyl 3-acetamido-2,4,6-triiodo-5-(3-methylureido)benzoate may be purified by solution in warm dimethyl formamide, treatment with decolorizing carbon, filtering and precipitation with water.

What is claimed is:
1. A compound of the formula

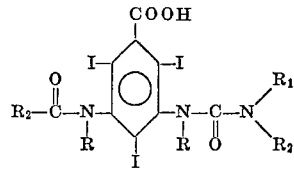

wherein R and $R_1$ are hydrogen or lower alkyl of up to 6 carbon atoms and $R_2$ is lower alkyl of up to 6 carbon atoms, and lower alkyl esters thereof, wherein the lower alkyl ester has up to 6 carbon atoms.

2. A compound of claim 1 wherein R and $R_1$ are hydrogen.
3. A compound of claim 1 wherein R and $R_1$ are lower alkyl.
4. A compound of claim 1 wherein one R is hydrogen and the other R is lower alkyl.
5. A compound of claim 4 wherein $R_1$ is hydrogen.
6. A compound of claim 4 wherein $R_1$ is lower alkyl.

References Cited
UNITED STATES PATENTS 3,004,964  10/1961  Wiegert ---------- 260—518 A
3,538,153  11/1970  Randall ---------- 260—518 A LORRAINE A. WEINBERGER, Primary Examiner L. A. THAXTON, Assistant Examiner U.S. Cl. X.R.

260—501.11, 518 A; 424—5